Jan. 23, 1968 R. K. MANHERZ ET AL 3,364,661
BLAST-FURNACE-GAS SAMPLING FILTER
Filed Nov. 27, 1964
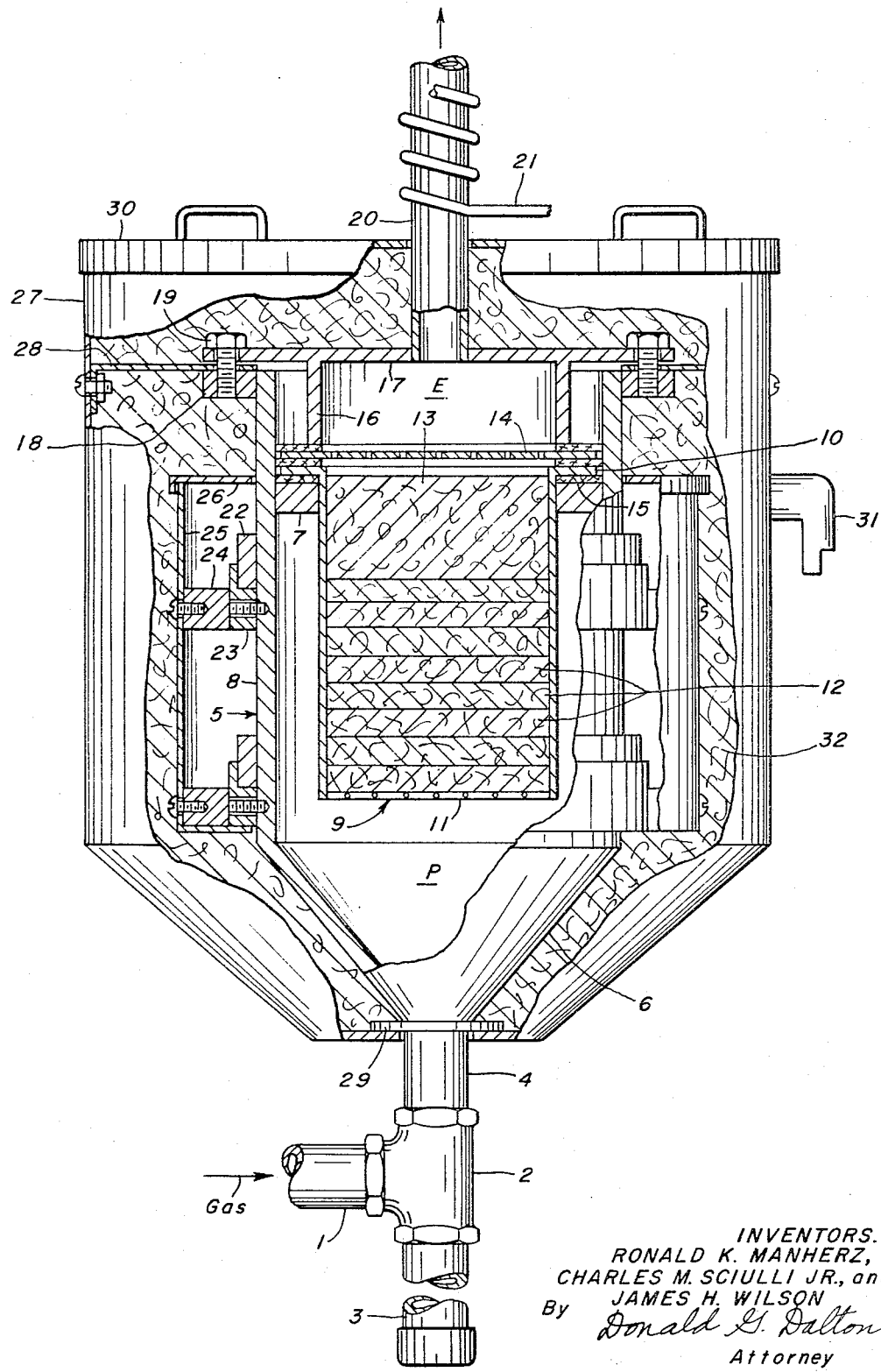
INVENTORS.
RONALD K. MANHERZ,
CHARLES M. SCIULLI JR., and
JAMES H. WILSON
By Donald G. Dalton
Attorney United States Patent Office 3,364,661
Patented Jan. 23, 1968

3,364,661
BLAST-FURNACE-GAS SAMPLING FILTER
Ronald K. Manherz, Mountain View, Calif., and Charles M. Sciulli, Jr., Pittsburgh, and James H. Wilson, Export, Pa., assignors to United States Steel Corporation, a corporation of Delaware
Filed Nov. 27, 1964, Ser. No. 414,161
3 Claims. (Cl. 55—267)

This invention relates to a gas filtering assembly that is particularly adapted to cleaning of top-gas test samples of iron-producing blast furnaces, and the like, to permit their analysis by modern analytical instruments.

Because top-gas composition is an immediate indication of conditions in the blast furnace, an accurate and continuous analysis of top gas is a useful tool in the determination of the conditions required for optimum blast-furnace performance.

However, analytical instruments, suitable for the purpose, require immaculately dust-free samples for their operation, and although the instruments may incorporate filters, these have been found unsuitable for handling samples directly from the furnaces.

Sampling probes should be located ahead of scrubbers, to obviate alteration of carbon dioxide and water content, for example, by the scrubbers. Also, samples should be taken at a point which minimizes delay in analysis. These factors cause the sampled gas to be essentially raw blast-furnace top gas, which is heavily dust laden and has a high dew point. The main difficulties encountered in use of arrangements presently available are insufficient cleaning of the gas, and plugging of the filter bed by moisture condensation, which results in a paste-like sludge that prevents the passage of the gas through the filtering media.

It is, therefore, an object of the present invention to provide a gas-filter assembly that is more effective for the cleaning of blast-furnace top-gas samples than those presently available for the purpose.

A more particular object of the invention is to provide a gas-filter assembly, adapted to the foregoing purpose, that effects a vertical filtration to utilize the effect of gravity in settling the entrained dust within the assembly, contains graded filtering sections to give maximum dust-loading capacity with maximum filtering efficiency, allows easy removal of the filtering media and cleaning of the housing, provides for easy installation, is of a rugged construction to withstand long use under the severe conditions prevailing at a commercial blast-furnace installation, provision for the collection of dust falling from the filtering media, and provision for the use of a prepacked filter cartridge, which permits the filter packing to be replaced without cooling the filter housing.

These and other objects and advantageous features of the invention will become apparent by reference to the following description, and the accompanying drawing illustrating a vertical view of one embodiment of the invention, with portions of the apparatus broken away to reveal interior construction.

The filter assembly has gas-sample inlet tube 1, one end of which is attached to the gas main of the furnace, which is not shown, and the other to the lateral port of vertical T-connection 2. Dust trap 3 is attached to the T-connection vertically therebelow, and vertically thereabove is attached entry port 4, the upper end of which is attached to filter housing 5 at its conical bottom portion 6.

Inwardly extending continuous circular flange member 7 is attached in gas-tight manner in the upper portion of cylindrical wall 8 of housing 5.

Replaceable filter cartridge 9, preferably cylindrical to conform generally to cylindrical housing 8, is mounted on flange 7 by its circumferential outwardly flaring lip 10. Cartridge 9 is additionally composed of a perforated bottom 11, a coarse filtering section 12, resting thereon, and a fine filtering section 13, thereabove, extending to perforated filter cover 14. The latter has an unperforated edge region, coextensive with cartridge lip 10.

There are circular gaskets 15 between flange 7 and lip 10, between lip 10 and filter cover 14, and between the latter and the lower edge of continuous circular flange 16.

Flange 16 is in register with flange 7, and is attached in gas-tight manner to the underside of cover plate 17. The cover plate overlaps outwardly extending flange 18, and is secured thereto by bolts 19. Cover 17 carries gas outlet port 20, located inside of flange 16. Outlet port 20, and piping connected thereto, but not shown, carry electrical heating elements 21.

Electrical heater rings 22 encircle the cylindrical portion 8 of filter housing 5, to which they are attached by clips 23. Spacers 24, attached to clips 23 support heater ring shield 25, with its separable cover 26.

Filter housing 5 is attached to outer jacket 27 by web 28, and is further supported in the jacket by flange 29. Jacket 27 has removable cover 30, and electrical conduit fitting 31, for heater ring wires, not shown. Insulation 32 fills the space between the outer jacket and the heated filter housing.

Conical bottom 6 of the filter housing defines plenum chamber P, wherein the velocity of the gas entering the housing is reduced, permitting substantial amounts of the dust entrained in the sample to settle out. The sloping sides of the chamber funnel settled dust into dust trap 3. Also, in operation, dust tends to deposit at bottom 11 of the filter cartridge, where the gas enters the cartridge, and this dust, as it becomes dislodged, similarly enters trap 3.

Cartridge bottom 11 contains perforations from edge to edge, and is adapted to permit gas to flow freely therethrough, while providing support for the filtering media. Expanded metal, welded to the lower edge of the cylindrical shell of the cartridge, has been found satisfactory, for example.

Upon entering perforated bottom 11, the gas passes through the filtering media, coarse section 12 of which is selected for its high dirt-holding capacity, while finer section 13 is chosen with a view to high filtering efficiency.

The filtering gas emerges from the filter bed, through filter cover 14, which has perforations coextensive with the top of the filter bed.

Flange 16, through the bolting of cover plate 17, is adapted to exert a clamping action, in conjunction with flange 7, upon cartridge lip 10 and the peripheral portion of cartridge cover 14, to produce, with the help of gaskets 15, a gas-tight seal between flanges 7 and 16.

Flange 16, in addition to its aforementioned clamping function, defines efflux chamber E, which constitutes a free space coextensive with the perforations of filter cover 14, to permit unhampered gas exit from the filter, and its access to outlet port 20.

The arrangement of flange 16, and cooperating clamping components, permits having the screw threads of bolts 19 out of contact with the gas samples, which are generally highly corrosive and tend to cause screw threads to freeze, with resultant cartridge change difficulties.

Replaceable filter cartridge 9, may have cover 14 attached in position to cover the filtering media, prior to cartridge installation.

The size of the filter housing is determined principally on the basis of filtering media, gas-flow rate, filter life, and sample delay time. The filter heating requirements depend upon inlet sample-line temperature, and the filter temperature necessary to prevent moisture condensation.

The filter temperature may be thermostatically controlled, by known procedures.

In one example, designed for gas flows up to about 0.2 cubic feet per minute, a filter housing, having at its bottom a plenum chamber with conical walls about 40° from the vertical, carried a filter cartridge about 12 inches in diameter. The coarse filtering section was composed of 8 1-inch thick discs of "Fiberglas" High Density Blanket, Type PF-334, Owens-Corning Glass Company. The fine filtering section consisted of 5 pounds of Long Staple Fiber-Fine Grade "Fiberfrax," Carborundum Company.

The course packing was compressed into about a 4-inch thick layer, and the fine packing made up into about 2-inch layer.

The dew-point of the gas sample was about 150° F., and filter and sample line temperatures were maintained above about 300° F.

The foregoing arrangement permitted continuous operation over a several month period, without filter cartridge replacement. The coarse packing was able to retain about 6 grams of dust per square inch of filter bed cross section, and the fine packing about 1 gram per square inch.

This invention, while particularly adapted to its blast-furnace-gas sampling application, has been found suitable in sampling operations involving similarly difficult to filter gases, such as those from open-hearth steel furnaces and oxygen steelmaking furnaces.

While we have endeavored to provide detailed practical embodiments of our invention, for the purpose of permitting its ready practice, it will be appreciated that equivalents in elements and arrangement may be introduced without departure from the spirit and scope of the invention.

We claim:
1. A gas sampling filter, adapted for use in advance of gas analytical instruments, which permits sampling of iron-producing blast furnace top gas ahead of scrubbers, and similar moist, heavily dust-laden samples, without interfering with sample moisture content and water absorbable gaseous components, comprising;
   (a) an essentially vertically walled filter medium housing with an inwardly and downwardly sloping sided bottom portion connected to a gas sample inlet tube, which sloping sided bottom also connects to a dust trap, therebelow, said housing being provided near its upper section, but somewhat below its top, with an internal flange member extending therearound, which flange is sealed gas-tight thereto;
   (b) a vertical container, internal to housing (a), and generally conforming to the shape thereof, provided with an outwardly extending perimetrical lip, the under surface of which is sealed to the upper surface of the housing (a) flange member, said container having a bottom composed of an edge-to-edge perforated member and a similarly perforated cover member across its top, said container being filled with a lower section of relatively coarse filtering medium and thereabove a relatively fine filtering medium;
   (c) an outwardly extending flange at the top of housing (a);
   (d) a cover for housing (a) adapted to be secured to flange (c), said cover being provided with a downwardly extending perimetrical flange superimposed upon the container (b) lip to obtain a gas-tight fit, said downwardly extending flange being of sufficient extent to provide a gas efflux chamber, and said cover being fitted with a gas outlet from said efflux chamber; and
   (e) means on said housing for heating housing (a) sufficiently to prevent condensation of moisture from the gas sample.
2. The filter of claim 1 in which filter medium container (b) is replaceable as a unit.
3. The filter of claim 1 in which the lower filtering medium is "Fiberglas" High Density Blanket, and the upper filtering medium is composed of Long Staple Fiber-Fine Grade "Fiberfrax."

References Cited

UNITED STATES PATENTS

| Re. 24,954 | 3/1961 | Church | 55—96 |
| 1,439,151 | 12/1922 | Dailey et al. | 55—487 X |
| 1,661,104 | 2/1928 | Barnebey | 55—269 |
| 1,714,245 | 5/1929 | Schaefer | 55—208 |
| 1,961,445 | 6/1934 | McCormick | 55—504 X |
| 2,096,851 | 10/1937 | Fricke | 55—486 X |
| 2,138,874 | 12/1938 | Myers | 55—516 X |
| 3,056,247 | 10/1962 | Pindzola et al. | 55—516 X |
| 3,138,440 | 6/1964 | Weittenhiller et al. | 55—268 X |
| 3,186,831 | 6/1965 | Pike | 266—31 X |

HARRY B. THORNTON, *Primary Examiner.*

ROBERT F. BURNETT, *Examiner.*

B. NOZICK, *Assistant Examiner.*